US007534492B2

(12) United States Patent
Chen et al.

(10) Patent No.: US 7,534,492 B2

(45) **Date of Patent: *May 19, 2009**

(54) FUSER MEMBER

(75) Inventors: Jiann-Hsing Chen, Fairport, NY (US); Joseph A. Pavlisko, Pittsford, NY (US); Shyh-Hua E. Jao, Pittsford, NY (US); Po-Jen Shih, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/472,888

(22) Filed: Jun. 22, 2006

(65) Prior Publication Data

US 2007/0298217 A1 Dec. 27, 2007

(51) Int. Cl.

*B32B 25/08* (2006.01)
*B32B 25/20* (2006.01)
*B32B 27/08* (2006.01)
*G03G 15/20* (2006.01)

(52) U.S. Cl. ....................... 428/421; 428/422; 428/447; 428/336

(58) Field of Classification Search ................. 428/421, 428/422, 447, 336

See application file for complete search history.

(56) References Cited

U.S. PATENT DOCUMENTS

| | | | | |
|---|---|---|---|---|
| 3,435,500 | A | 4/1969 | Aser et al. | |
| 4,789,565 | A | 12/1988 | Kon et al. | |
| 5,011,401 | A | 4/1991 | Sakurai et al. | |
| 5,153,660 | A | 10/1992 | Goto | |
| 5,520,600 | A | 5/1996 | Fukumoto | |
| 5,547,759 | A | 8/1996 | Chen et al. | |
| 5,709,949 | A | 1/1998 | Chen et al. | |
| 5,998,034 | A | 12/1999 | Marvil et al. | |
| 6,372,833 | B1 | 4/2002 | Chen et al. | |
| 6,596,357 | B1 | 7/2003 | Marvil et al. | |
| 2007/0296122 | A1 | 12/2007 | Chen et al. | |
| 2007/0298251 | A1 | 12/2007 | Chen et al. | |
| 2007/0298252 | A1 * | 12/2007 | Chen et al. | 428/339 |

* cited by examiner

*Primary Examiner*—Kevin R. Kruer

(74) *Attorney, Agent, or Firm*—Carl F. Ruoff; Andrew J. Anderson

(57) ABSTRACT

The fuser members of this invention include a core member that includes a rigid outer surface. An adhesion promoter layer comprising silane or epoxy silane coupling is disposed on the outer surface of the core member. A resilient layer comprising an elastomer is disposed on the adhesion promoter layer. A tie layer is disposed on the resilient layer, the tie layer being made of fluoropolymers, fluoroelastomers, fluorocarbon thermoplastic copolymers and mixtures thereof. A primer layer, disposed on the tie layer, comprising perfluoroalkoxy resin and trifluoroethylene-perfluoroethyl vinyl ether-perfluoroethylene vinyl phosphate or a mixture of perfluoroalkoxy resin and trifluoroethylene-perfluoroethylvinyl ether; and an outer layer of fluoropolymer resin made from polytetrafluoroethylene, polyperfluoroalkoxy-tetrafluoroethylene, polyfluorinated ethylene-propylene and blends thereof is disposed on the primer layer.

18 Claims, 2 Drawing Sheets

FUSER MEMBER

CROSS-REFERENCE TO RELATED APPLICATIONS

This application relates to commonly assigned, copending U.S. application: Ser. No. 11/472,918 "FUSER MEMBER", U.S. application: Ser. No. 11/472,771 "FUSING MEMBER", U.S. application: Ser. No. 11/472,919 "METHOD OF MAKING FUSER MEMBER" all said applications having been filed simultaneously herewith.

FIELD OF THE INVENTION

This invention relates to electrostatographic apparatus and coated fuser members and methods of making coated fuser members, and in particular to a conformable roller which includes an outermost fluoropolymer resin layer uniquely bonded to a silicone base cushion layer by means of a fluoroelastomer layer. More particularly, this invention relates to an improved multi-layer coating for fuser members and the method of making the multi-layer coated fuser members for oil-free color digital printing application.

BACKGROUND OF THE INVENTION

Known to the electrostatographic fixing art are various fuser members adapted to apply heat and pressure to a heat-softenable electrostatographic toner on a receiver, such as paper, to permanently fuse the toner to the receiver. Examples of fuser members include fuser rollers, pressure rollers, fuser plates and fuser belts for use in fuser systems such as fuser roller systems, fuser plate systems and fuser belt systems. The term "fuser member" is used herein to identify one of the elements of a fusing system. Commonly, the fuser member is a fuser roller or pressure roller and the discussion herein may refer to a fuser roller or pressure roller, however, the invention is not limited to any particular configuration of fuser member.

One of the long-standing problems with electrostatographic fixing systems is the adhesion of the heat-softened toner particles to the surface of a fuser member and not to the receiver, known as offset, which occurs when the toner-bearing receiver is passed through a fuser system. There have been several approaches to decrease the amount of toner offset onto fuser members. One approach has been to make the toner-contacting surface of a fuser member, for example, a fuser roller and/or pressure roller of a non-adhesive (non-stick) material.

One known non-adhesive coating for fuser members comprises fluoropolymer resins, but fluoropolymer resins are non-compliant. It is desirable to have compliant fuser members to increase the contact area between a fuser member and the toner-bearing receiver. However, fuser members with a single compliant rubber layer absorb release oils and degrade in a short time leading to wrinkling artifacts, non-uniform nip width and toner offset. To make fluoropolymer resin coated fuser members with a compliant layer, U.S. Pat. Nos. 3,435,500 and 4,789,565 disclose a fluoropolymer resin layer sintered to a silicone rubber layer, which is adhered to a metal core. In U.S. Pat. No. 4,789,565, an aqueous solution of fluoropolymer resin powder is sintered to the silicone rubber layer. In U.S. Pat. No. 3,435,500, a fluoropolymer resin sleeve is sintered to the silicone rubber layer. Sintering of the fluoropolymer resin layer is usually accomplished by heating the coated fuser members to temperatures of approximately 500° C. Such high temperatures can have a detrimental effect on the silicone rubber layer causing the silicone rubber to smoke or depolymerize, which decreases the durability of the silicone rubbers and the adhesion strength between the silicone rubber layer and the fluoropolymer resin layer. Attempts to avoid the detrimental effect the high sintering temperatures have on the silicone rubber layer have been made by using dielectric heating of the fluoropolymer resin layer, for example see U.S. Pat. Nos. 5,011,401 and 5,153,660. Dielectric heating is, however, complicated and expensive and the fluoropolymer resin layer may still delaminate from the silicone rubber layer when the fuser members are used in high-pressure fuser systems. Another U.S. Pat. Nos. 5,547,759 and 5,709,949 to Chen, et al. discloses a method of bonding a fluoropolymer resin to various substrate including silicone via a layer of fluoroelastomer layer and fluoropolymer containing polyamide-imide layer. But this requires a thin base layer to prevent the degradation of silicone base cushion substrate during the sintering process. U.S. Pat. Nos. 5,998,034 and 6,596,357 to Marvil et al. also discloses a multilayer fuser roller having fluoropolymer coating on a compliant base layer. However, this requires pre-baking steps in an infrared oven to prevent the degradation of primer layer and silicone base cushion. In addition, a fuser member made with a fluoropolymer resin sleeve layer possesses poor abrasion resistance and poor heat resistance.

For the foregoing reasons, there is a need for fuser members and a method of fabricating fuser members which have a fluoropolymer resin layer and a thick compliant layer or layers exhibiting improved adhesion between their constituent layers, improved abrasion resistance, improved heat resistance and the ability to be made more economically.

SUMMARY OF THE INVENTION

The fuser members of this invention include a core member that includes a rigid outer surface. An adhesion promoter layer comprising silane or epoxy silane coupling agent is disposed on the outer surface of the core member. A resilient layer comprising an elastomer is disposed on the adhesion promoter layer. A tie layer is disposed on the resilient layer, the tie layer being made of fluoropolymers, fluoroelastomers, fluorocarbon thermoplastic copolymers and mixtures thereof. A primer layer, disposed on the tie layer, comprising perfluoroalkoxy resin and trifluoroethylene-perfluoroethylvinyl ether-perfluoroethylene vinyl phosphate or a mixture of perfluoroalkoxy resin and trifluoroethylene-perfluoroethylvinyl ether; and an outer layer of fluoropolymer resin made from polytetrafluoroethylene, polyperfluoroalkoxy-tetrafluoroethylene, polyfluorinated ethylene-propylene and blends thereof is disposed on the primer layer.

ADVANTAGES

The fuser members of this invention have good non-adhesiveness to toner, abrasion resistance, heat resistance and adhesion between the layers. There is little or no deterioration of the layers or of the adhesion between the layers during the sintering step of the process, because the fluoroelastomer layer, and fluoropolymer resin layer have good heat resistance.

These and other features, aspects, and advantages of the present invention will become better understood with regard to the following description and claims.

Figure 1:
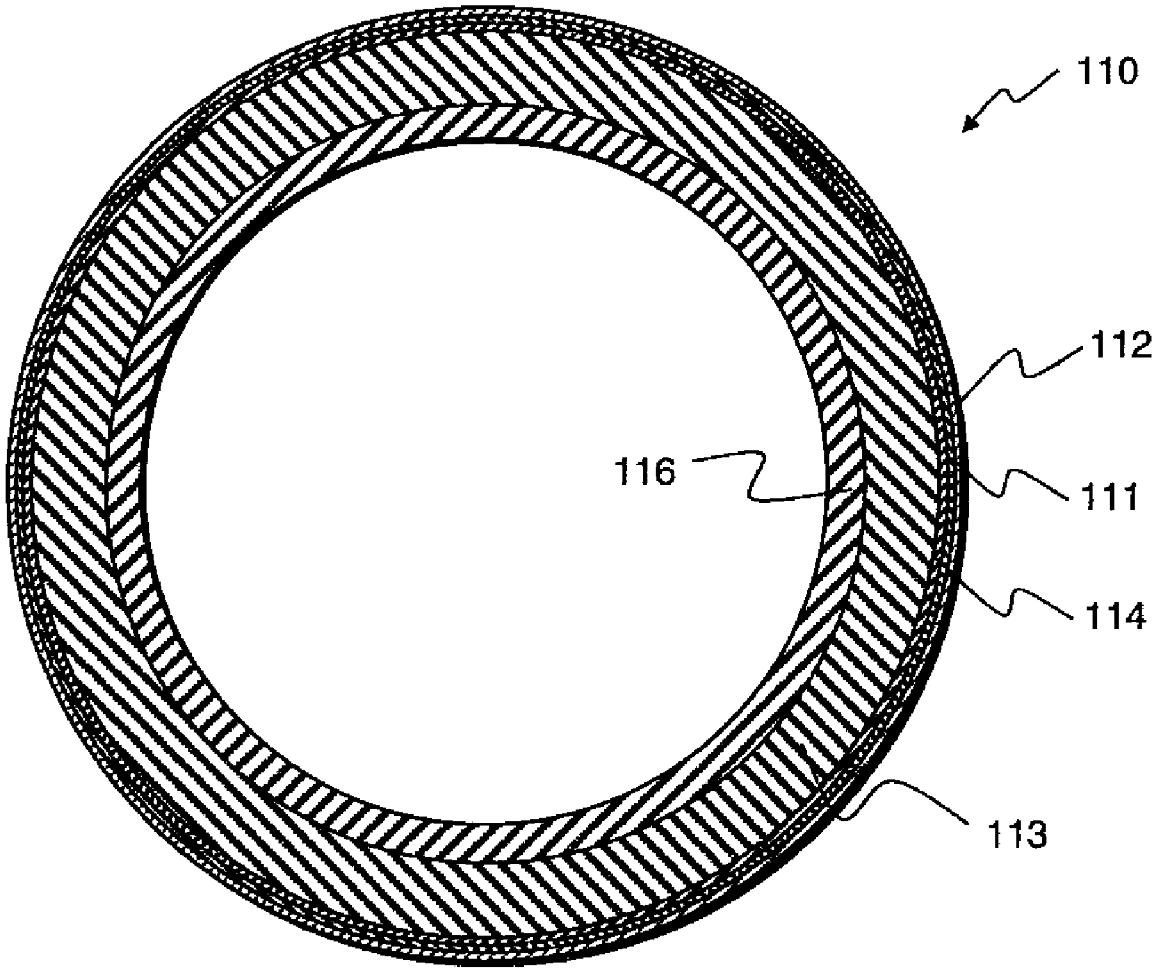
FIG. 1 is a cross-sectional view of a fuser member in accordance with the present invention.

For a better understanding of the present invention together with other advantages and capabilities thereof, reference is made to the following description and appended claims in connection with the preceding drawings.

DETAILED DESCRIPTION OF THE INVENTION

Since sintering the non-stick perfluoroalkoxy-tetrafluoroethylene (PFA) fluoropolymer resin top coat layer is usually accomplished by heating the coated fuser member to temperature up to 400° C., it is highly desirable to provide a good insulation layer between the non-stick fluoropolymer resin layer and soft, heat unstable silicone rubber base layer. Attempts to avoid the detrimental effect the high sintering temperature upon the silicone layer have not been satisfactory and were complicated. Most importantly, the additional tie layer between the fluoropolymer resin topcoat layer and the compliant silicone substrate layer must provide good bonding between these two layers under harsh stress and elevated temperature conditions. Common problems seen were delamination and wrinkling of the non-stick topcoat layer.

The current invention provides a fuser member having a fluoropolymer (fluoroelastomer or fluorocarbon thermoplastic copolymer (FLC) or a mixture thereof) as a tie layer was found to provide good adhesion between the non-stick fluoropolymer resin top coat layer and the compliant silicone substrate layer. In addition, the current invention comprising the fluoroelastomer or the fluorocarbon thermoplastic random copolymer (FLC) is incorporated with fluoropolymer resin fillers (PFA, FEP, PTFE etc.) to increase the adhesion between the fluoropolymer resin outer layer and the tie layer are achieved by high temperature sintering process. This also strengthens the adhesion to adjacent silicone layer and prevents the degradation of the silicone base cushion layer under high temperature applications, such as, external heated conditions.

The fuser member of this invention comprises, in order, a core member comprising a cylindrical rigid outer surface;

a resilient layer disposed on the cylindrical outer surface comprising an elastomer;

a tie layer disposed on said resilient layer, said tie layer selected from the group consisting of fluoropolymers, fluoroelastomers, fluorocarbon thermoplastic copolymers and mixtures thereof;

a primer layer, disposed on said tie layer, comprising perfluoroalkoxy resin and trifluoroethylene-perfluoroethyl vinyl ether-perfluoroethylene vinyl phosphate or a mixture of perfluoroalkoxy resin and trifluoroethylene-perfluoroethylvinyl ether; and an outer layer comprising fluoropolymer resin selected from the group consisting of polytetrafluoroethylene, polyperfluoroalkoxy-tetrafluoroethylene, polyfluorinated ethylene-propylene, and blends thereof disposed on the primer layer. In preferred embodiments of the invention, the bonds between the fluoropolymer resin layers, primer layers and fluoroelastomer layers are very strong, making it very difficult to peel the layers apart.

In all embodiments, inventive rollers are preferably cylindrically symmetrical, i.e., a cross-section of the roller taken at a right angle to the roller axis anywhere along the length of the roller has radial symmetry around the roller axis. The length of the roller thereof determines the range of the printing width of the substrate.

Although not explicitly disclosed in the preferred embodiments, it will be understood that an optional supplementary source of heat for fusing, either external or internal, may be provided, directly or indirectly, to any roller included in a fusing station of the invention.

FIG. 1 shows a cross-sectional view of a fuser member 110, according to an embodiment of the invention, of which the applications include fuser rollers, pressure rollers, and oiled donor rollers, etc. The generally concentric central core or support 116 for supporting the plurality of the layers is usually metallic, such as stainless steel, steel, aluminum, etc. The primary requisite for the central core 116 materials are that it provides the necessary stiffness, being able to support the force placed upon it and to withstand a much higher temperature than the surface of the roller where there is an internal heating source. Deposited above the support 116 is a resilient layer, also termed the base cushion 113, which is characterized in the art as a "cushion" layer, with a function to accommodate the displacement for the fusing nip. Deposited above the base cushion layer 113 is a tie layer 114, which can be made of Viton, fluoroelastomer, or other fluoropolymer, such as fluorocarbon thermoplastic copolymer and mixtures thereof. Subsequently deposited above the tie layer 113 is a primer layer 111. The outermost layer 112, is a toner release layer, which comprises the fluoropolymer resins, including PTFE, PFA, and FEP, etc. and blends thereof, deposited on the primer layer 111.

Figure 2:
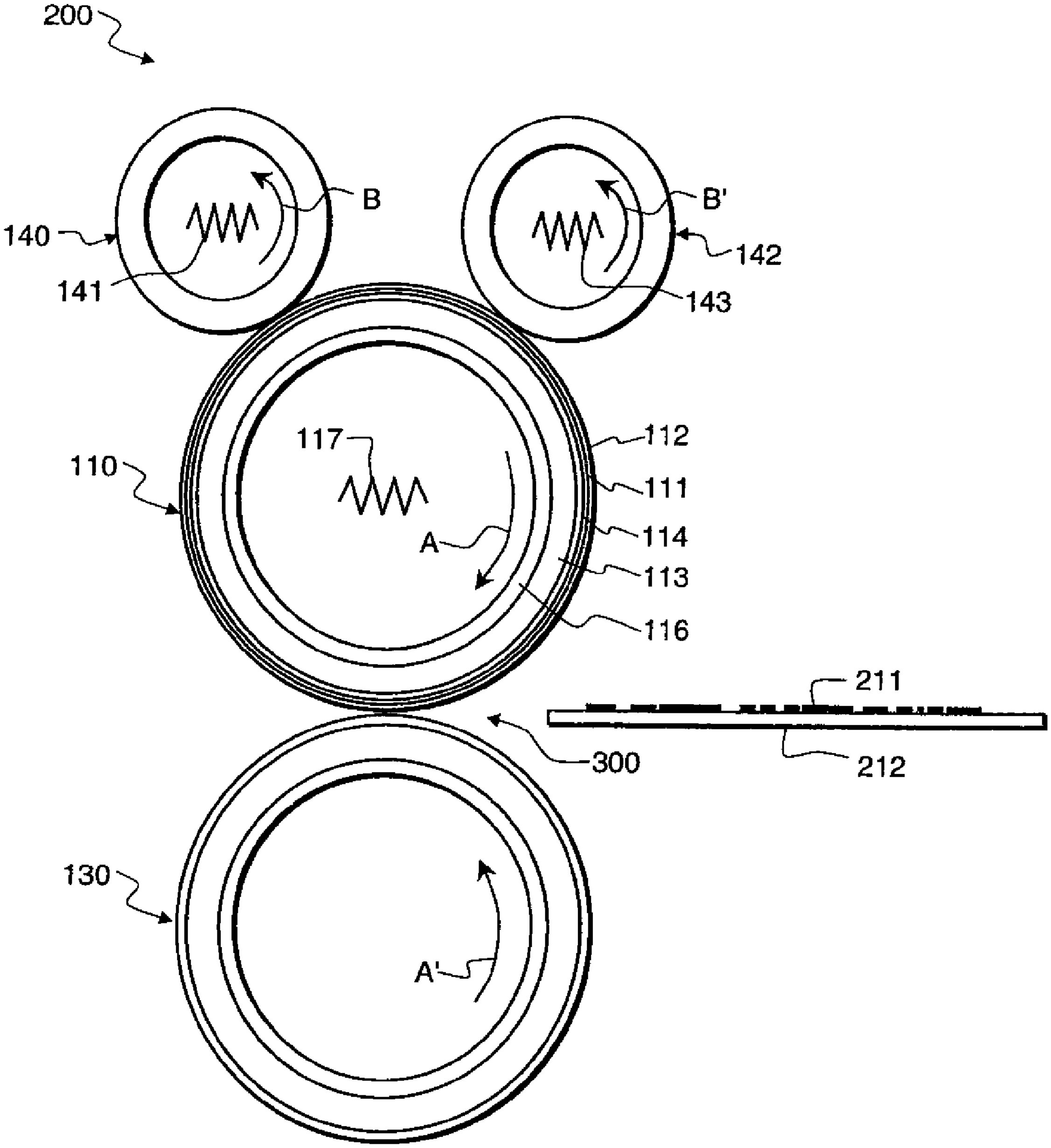
FIG. 2 is a schematic cross-sectional view of a fusing apparatus in accordance with the present invention.

Referring now to the accompanying drawing, FIG. 2 shows a preferred embodiment of the fuser station, inclusive of the inventive fuser roller structure 200. The rotating fuser roller 110 moving in the direction indicated by arrow A includes a plurality of layers disposed about the axis of rotation; the plurality of the layers including a cylindrical core member 116 of high stiffness material, such as aluminum or steel, a relatively thick compliant base-cushion layer (BCL) 113, formed or molded on the core with perfect bondage at the interface, a seamless and relatively thin Viton layer 114, coated on top of the BCL 113, a seamless and relatively thin primer layer 111 coated on the Viton layer 114, with perfect bondage at the interface and a seamless and relatively thin topcoat 112, of relatively stiffer material such as PFA than the elastomeric materials, coated on top of the primer layer 111, with perfect bondage at the interface. The PFA topcoat is a thermally resistant layer used for release of the substrate from the fusing member 110.

The surface of the fuser roller 110 can be externally heated by heater rollers, 140 and 142 (moving in directions indicated by arrows B and B'), which are of incandescent or ohm-rated heating filament 141 and 143, or internally heated by the incandescent or ohm-rated heating filament 117, or heated by the combination of both external heater rollers, 140 and 142, and internally heating incandescent or ohm-rated filament 117. A counteracting pressure roller 130 rotating in the direction A', countering the fuser roller rotating direction A forms a fusing nip 300 with the fuser roller 110 made of a plurality of compliant layers. An image-receiving substrate 212, generally paper, carrying unfused toner 211, i.e., fine thermoplastic powder of pigments, facing the finer roller 110 is shown approaching the fusing nip 300. The substrate is fed by employing well known mechanical transports (not shown) such as a set of rollers or a moving web for example. The fusing station is preferable driven by one roller, for instance the fusing roller, 110, with pressure roller 130 and optional heater rollers, 140 and 142, being driven rollers.

The fuser member can be a pressure or fuser plate, pressure or fuser roller, a fuser belt or any other member on which a release coating is desirable. The support for the fuser member can be a metal element with or without additional layers adhered to the metal element. The metal element can take the shape of a cylindrical core, plate or belt. The metal element can be made of, for example, aluminum, stainless steel or nickel. The surface of the metal element can be rough, but it is not necessary for the surface of the metal element to be rough to achieve good adhesion between the metal element and the layer attached to the metal element. The additional support layers adhered to the metal element are layers of materials useful for fuser members, such as, silicone rubbers, fluoroelastomers and primers.

In one preferred embodiment of the invention, the support is a metal element coated with an adhesion promoter layer. The adhesion promoter layer can be any commercially available material known to promote the adhesion between silicone rubber and metal, such as silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Preferred adhesion promoters are epoxy-functionalized silane coupling agents. The most preferable adhesion promoter is a dispersion of Thixon™ 300, Thixon™ 311 and triphenylamine in methyl ethyl ketone. The Thixon™ materials are supplied by Morton Chemical Co.

In another preferred embodiment of the invention, the support is a metal element with one or more resilient layer formed on said core member comprising an elastomer base cushion layers. The base cushion layer or layers can be of known materials for fuser member layers such as, one or more layers of silicone rubbers, fluorosilicone rubbers, or any of the same materials that can be used to form elastomer layers. Preferred silicone rubber layers are polymethyl siloxanes, such as EC-4952 (condensation cured silicone rubber), S5100 (addition cured silicone rubber), sold by Emerson Cummings or other additional cured silicone rubber Silastic™ J or E sold by Dow Corning or X-34-1284, X-34-2045 sold by ShinEtsu company. Preferred fluorosilicone rubbers include polymethyltrifluoropropylsiloxanes, such as Sylon™ Fluorosilicone FX11293 and FX11299 sold by 3M.

In cases where it is intended that the fuser member be heated by an internal heater, it is desirable that the outer layer have a relatively high thermal conductivity, so that the heat can be efficiently and quickly transmitted toward the outer surface of the fuser member that will contact the toner to be fused. Depending upon relative thickness, it is generally also very desirable for the base cushion layer and any other intervening layers to have a relatively high thermal conductivity.

The thickness and composition of the base cushion and release layers can be chosen so that the base cushion layer provides the desired resilience to the fuser member, and the release layer can flex to conform to that resilience. Usually, the release layer is thinner than the base cushion layer. For example, cushion layer thicknesses in the range from about 1.0 mm to about 10.0 mm have been found to be appropriate for various applications. In some embodiments of the present invention, the base cushion layer is about 5.0 mm thick, and the outer layer is from about 5 μm to about 50 μm thick.

According to the current invention, suitable materials for the base cushion layer include any of a wide variety of materials previously used for base cushion layers, such as the condensation cured polydimethylsiloxane marketed as EC4952 by Emerson Cuming. Another example of a additional cured silicon rubber base cushion layer is marked as S5100 by Emerson Cuming. An example of an additional cured silicone rubber is X-34-1284 from ShinEtsu Company, which is applied over a silane primer X-33-173 or X-33-156-20, also obtainable from ShinEtsu Company.

In a particular embodiment of the invention, the base cushion is resistant to cyclic stress induced deformation and hardening. Examples of suitable materials to reduce cyclic stress induced deformation and hardening are filled condensation-crosslinked PDMS elastomers, disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), and U.S. patent application Ser. No. 08/159,013 (nickel oxide filler). These materials all show reasonable thermal conductivities and much less change in hardness and creep than EC4952 or the PDMS elastomer with aluminum oxide filler. Additional suitable base cushions are disclosed in U.S. patent application Ser. No. 08/268,136, entitled "Zinc Oxide Filled Diphenylsiloxane-Dimethylsiloxane Fuser Roll for Fixing Toner to a Substrate", U.S. patent application Ser. No. 08/268,141, entitled "Tin Oxide Filled Diphenylsiloxane-Dimethylsiloxane Fuser Roll for Fixing Toner to a Substrate", U.S. patent application Ser. No. 08/268,131, entitled "Tin Oxide Filled Dimethylsiloxane-Fluoroalkylsiloxane Fuser Roll for Fixing Toner to a Substrate". The disclosures of the patents and patent applications mentioned in this paragraph are hereby incorporated herein by reference.

The support of the fuser member, which is usually cylindrical in shape, can be formed from any rigid metal or plastic substance. Because of their generally high thermal conductivity, metals are preferred when the fuser member is to be internally heated. Suitable support materials include, e.g., aluminum, steel, various alloys, and polymeric materials such as thermoset resins, with or without fiber reinforcement. The support that has been conversion coated and primed with metal alkoxide primer in accordance with U.S. Pat. No. 5,474,821, the disclosure of which is incorporated herein by reference.

The fuser member is mainly described herein in terms of embodiments in which the fuser member is a fuser roll having a support, an adhesion promoter layer, a base cushion layer overlying the support, a tie layer, a primer layer and an outer layer superimposed on the primer layer. The invention is not, however, limited to a roll, nor is the invention limited to a fusing member having a support bearing two layers: the base cushion layer and the outer layer. The fuser member of the invention can have a variety of outer configurations and layer arrangements known to those skilled in the art. For example, the base cushion layer may be eliminated or the outer layer described herein can be overlaid by one or more additional layers.

The base cushion layer may be adhered to the metal element via a base cushion primer layer. The base cushion primer layer can include a primer composition which improves adhesion between the metal element and the material used for the base cushion layer. If the base cushion layer is a fluoroelastomer material, the adhesion promoters described above can be used as the base cushion primer layer. Other primers for the application of fluorosilicone rubbers and silicone rubbers to the metal element are known in the art. Such primer materials include silane coupling agents such as X-33-176 or X-33-156-10 sold by ShinEtsu Company, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide.

The inclusion of a base cushion layer on the metal element of the support increases the compliancy of the fuser member. By varying the compliancy, optimum fuser members and fuser systems can be produced. The variations in the compliancy provided by optional base cushion layers are in addition to the variations provided by just changing the thickness or materials used to make the fluoroelastomer layer and/or fluoropolymer resin layer. The presently preferred embodiment in a fuser roller system is to have a very compliant fuser roller and a non-compliant or less compliant pressure roller. In a fuser belt system it is preferred to have a compliant pressure roller and a non-compliant or less compliant belt. Although the above are the presently preferred embodiments, fuser systems and members including plates, belts and rollers can be made in various configurations and embodiments wherein at least one fuser member is made according to this invention.

The fluoroelastomer layer include copolymers of vinylidene fluoride and hexafluoropropylene, copolymers of tetrafluoroethylene and propylene, terpolymers of vinylidene fluoride, hexafluoropropylene and tetrafluoroethylene, terpolymers of vinylidene fluoride, tetrafluoroethylene and perfluoromethylvinylethyl, and terpolymers of vinylidene fluoride, tetrafluoroethylene, and perfluoromethylvinylether. Specific examples of fluoroelastomers which are useful in this invention are commercially available from E. I. DuPont de Nemours and Company under the trade names Kalrez™, and Viton™ A, B, G, GF and GLT, and from 3M Corp. under the trade names Fluorel™ FC 2174, 2176 and FX 2530 and FLS 2640 and FE 5832 and Aflas™. Additional vinylidene fluoride based polymers useful in the fluoroelastomer layer are disclosed in U.S. Pat. No. 3,035,950, the disclosure of which is incorporated herein by reference. Mixtures of the foregoing fluoroelastomers may also be suitable. Although it is not critical in the practice of this invention, the number-average molecular weight range of the fluoroelastomers may vary from a low of about 10,000 to a high of about 200,000. In the preferred embodiments, vinylidene fluoride-based fluoroelastomers have a number-average molecular weight range of about 50,000 to about 100,000.

A preferable material for the fluoroelastomer layer is a compounded mixture of a fluoroelastomer polymer, a curing material, and optional fillers. The curing material can include curing agents, crosslinking agents, curing accelerators and fillers or mixtures of the above. Suitable curing agents for use in the process of the invention include the nucleophilic addition curing agents as disclosed, for example, in the patent to Seanor, U.S. Pat. No. 4,272,179, incorporated herein by reference. Exemplary of a nucleophilic addition cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred. Suitable curing accelerators for the bisphenol curing method include organophosphonium salts, e.g., halides such as benzyl triphenylphosphonium chloride, as disclosed in U.S. Pat. No. 4,272,179 cited above.

The fluoroelastomer also can include fluoropolymer resin filler. Fluoropolymer resin filler are added to polymeric compositions from 10 to 100 pph based on the weight of the fluoroelastomer layer to provide added adhesion strength and mechanical strength to a surface layer. In the fluoroelastomer layer of the fuser member of this invention, inclusion of the fluoropolymer resin filler is preferred. Omission of the fluoropolymer resin filler will reduce the adhesive strength of the fluoroelastomer layer to the top layer. Suitable fluoropolymer resin fillers include a fluoropolymer material, such as a semicrystalline fluoropolymer or a semicrystalline fluoropolymer composite. Such materials include polytetrafluoroethylene (PTFE), polyperfluoroalkoxy-tetrafluoroethylene (PFA), polyfluorinated ethylene-propylene (FEP), poly(ethylenetetrafluoroethylene), polyvinylfluoride, polyvinylidene fluoride, poly(ethylene-chloro-trifluoroethylene), polychlorotrifluoroethylene and mixtures of fluoropolymer resins.

The fluoroelastomer can include inert filler. Inert fillers are frequently added to polymeric compositions to provide added strength and abrasion resistance to a surface layer. In the fluoroelastomer layer of the fuser member of this invention, inclusion of the inert filler is optional. Omission of the inert filler does not reduce the adhesive strength of the fluoroelastomer layer. Suitable inert fillers that are optionally used include mineral oxides, such as alumina, silica, titania, and carbon of various grades.

Nucleophilic addition-cure systems used in conjunction with fluoroelastomers can generate hydrogen fluoride and thus acid acceptors may be added as fillers. Suitable acid acceptors include Lewis bases such as lead oxide, magnesium oxide, such as Megalite™ D and Y supplied by Merck & Co., calcium hydroxide, such as C-97, supplied by Fisher Scientific Co., zinc oxide, copper oxide, tin oxide, iron oxide and aluminum oxide which can be used alone or as mixtures with the aforementioned inert fillers in various proportions. The most preferable fluoroelastomer layer material is a compounded mixture of 100 parts Viton™ A, from 2 to 9 parts 2,2-bis(4-hydroxyphenyl) hexafluoropropane, commercially available as Cure™ 20, from 2 to 10 parts benzyl triphenylphosphonium chloride, commercially available as Cure 30™, from 5 to 30 parts lead oxide and from 0 to 30 parts Thermax™ (carbon black), mechanically compounded at room temperature on a two roll mill until it forms a uniform mixture. Cure™ 20 and Cure™ 30 are products of Morton Chemical Co. Thermax™ is a product of R. T. Vanderbilt Co., Inc. This compounded mixture can either be compression molded onto the support, or dispersed in solvent for dip-, ring- or spray-coating onto the support. If ring-coating is used to apply this compounded mixture to the support, then it is preferable to add a small amount of aminosiloxane polymer to the formulation described above, while compounding the fluoroelastomer material. For additional information on this fluoroelastomer composite material, see U.S. Pat. No. 4,853,737, which is incorporated herein by reference.

The fluoroelastomer layer can also be an interpenetrating network of fluoroelastomer and a silicone polymer. An interpenetrating network coating composition can be obtained by mechanically compounding fluoroelastomer polymer, functionalized siloxane, fluorocarbon curing materials and optional acid acceptors or other fillers to form a uniform mixture suitable for compression molding or solvent coating after dispersing the composite in a solvent. The fluoroelastomer polymers, curing materials, curing agents, curing accelerators, acid acceptors and other fillers can be selected from those previously described above. The functionalized siloxane is preferably a polyfunctional poly($C_{1-6}$ alkyl)phenyl siloxane or polyfunctional poly($C_{1-6}$ alkyl)siloxane. Preferred siloxanes are heat-curable, however peroxide-curable siloxanes can also be used with conventional initiators. Heat curable siloxanes include the hydroxy-functionalized organopolysiloxanes belonging to the classes of silicones known as “hard” and “soft” silicones. Preferred hard and soft silicones are silanol-terminated polyfunctional organopolysiloxanes.

Exemplary hard and soft silicones are commercially available or can be prepared by conventional methods. Examples of commercially available silicones include DC6-2230 silicone and DC-806A silicone (sold by Dow Corning Corp.), which are hard silicone polymers, and SFR-100 silicone (sold by General Electric Co.) and EC-4952 silicone (sold by Emerson Cummings Co.), which are soft silicone polymers. DC6-2230 silicone is characterized as a silanol-terminated polymethyl-phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC-806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR-100 silicone is characterized as a silanol- or trimethylsilyl-terminated polymethylsiloxane and is a liquid blend comprising about 60 to 80 weight percent of a difunctional polydimethylsiloxane having a number-average molecular weight of about 90,000 and 20 to 40 weight percent of a polymethylsilyl silicate resin having monofunctional (i.e. $SiO_2$) repeating units in an average ratio of between about 0.8 and 1 to 1, and having a number-average molecular weight of about 2,500. EC-4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000.

Preferred fluoroelastomer-silicone interpenetrating networks have ratios of silicone to fluoroelastomer polymer between about 0.1 and 1 to 1 by weight, preferably between about 0.2 and 0.7 to 1. The interpenetrating network is preferably obtained by mechanically compounding, for example, on a two-roll mill a mixture comprising from about 40 to 70 weight percent of a fluoroelastomer polymer, from 10 to 30 weight percent of a curable polyfunctional poly($C_{1-6}$ alkyl) phenylsiloxane or poly($C_{1-6}$ alkyl)siloxane polymer, from 1 to 10 weight percent of a curing agent, from 1 to 3 weight percent of a curing accelerator, from 5 to 30 weight percent of an acid acceptor type filler, and from 0 to 30 weight percent of an inert filler.

When a fluoroelastomer-silicone interpenetrating network is the fluoroelastomer layer material, the support is coated by conventional techniques, usually by compression molding or solvent coating. The solvents used for solvent coating include polar solvents, for example, ketones, acetates and the like. Preferred solvents for the fluoroelastomer based interpenetrating networks are the ketones, especially methyl ethyl ketone and methyl isobutyl ketone. The dispersions of the interpenetrating networks in the coating solvent are at concentrations usually between about 10 to 50 weight percent solids, preferably between about 20 to 30 weight percent solids. The dispersions are coated on the support to give a 10 to 100 micrometer thick sheet when cured.

Curing of the interpenetrating network is carried out according to the well known conditions for curing fluoroelastomer polymers ranging, for example, from about 12 to 48 hours at temperatures of between 50° C. to 250° C. Preferably, the coated composition is dried until solvent free at room temperature, then gradually heated to about 230° C. over 24 hours, then maintained at that temperature for 24 hours.

Additional information on fluoroelastomer-silicone polymer interpenetrating networks can be found in U.S. patent application Ser. No. 122,754 filed Sep. 16, 1993, which is a continuation of U.S. patent application Ser. No. 940,929, filed Sep. 4, 1992. Also see, U.S. patent application Ser. No. 940,582, filed Sep. 4, 1992. These three patent applications are assigned to the Eastman Kodak Co. The disclosures of these patent applications are incorporated herein by reference.

The fluoroelastomer layer can also include a fluorocarbon thermoplastic copolymer comprising a copolymer of vinylidene fluoride and hexafluoropropylene, the cured fluorocarbon thermoplastics random copolymer having subunits of:

$$—(CH_2CF_2)x—, —(CF_2CF(CF_3))y-, \text{ and } —(CF_2CF_2)z-,$$

wherein x is from 1 to 40 or 60 to 80 mole percent, z is greater than 40 to no more than 89 mole percent, and y is such that x+y+z equals 100 mole percent.

Suitable fluorocarbon thermoplastic random copolymers are available commercially. In a particular embodiment of the invention, a vinylidene fluoride-co-tetrafluoroethylene co-hexafluoropropylene, which can be represented as -(VF)(75)-(TFE) (10) -(HFP)(25)-, was employed. This material is marketed by Hoechst Company under the designation "THV Fluoroplastics" and is referred to herein as "THV". In another embodiment of the invention, a vinylidene fluoride-co-tetrafluoroethylene-co-hexafluoropropylene, which can be represented as -(VF)(42)-(TFE) (10) -(HFP)(58)-, was used. This material is marketed by Minnesota Mining and Manufacturing, St. Paul, Minn., under the designation "3M THV" and is referred to herein as "THV-200". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperature. With flexural modulus values between 83 Mpa and 207 Mpa, THV Fluoroplastics are the most flexible of the fluoroplastics.

The molecular weight of the uncured polymer is largely a matter of convenience; however, an excessively large or excessively small molecular weight would create problems, the nature of which are well known to those skilled in the art. In a preferred embodiment of the invention the uncured polymer has a number average molecular weight in the range of about 100,000 to 200,000.

The fluoropolymer resin outer layer includes a fluoropolymer material, such as a semicrystalline fluoropolymer or a semicrystalline fluoropolymer composite. Such materials include polytetrafluoroethylene (PTFE), polyperfluoroalkoxy-tetrafluoroethylene (PFA), polyfluorinated ethylene-propylene (FEP), poly(ethylenetetrafluoroethylene), polyvinylfluoride, polyvinylidene fluoride, poly(ethylene-chlorotrifluoroethylene), polychlorotrifluoroethylene and mixtures of fluoropolymer resins. Some of these fluoropolymer resins are commercially available from DuPont as Teflon™ or Silverstone™ materials.

The preferred fluoropolymer resin layer is a polyperfluoroalkoxy-tetrafluoroethylene (PFA), commercially available from DuPont under the trade name Teflon™ 855P322-32, Teflon™ 855P322-53, Teflon™ 855P322-55, Teflon™ 855P322-57, Teflon™ 855P322-58 and Teflon™ 857-210. Particularly Teflon™ 855P322-53; Teflon™ 855P322-57, and Teflon™ 855P322-58 are preferred because it is durable, abrasion resistant and forms a very smooth layer. The polyperfluoroalkoxy-tetrafluoroethylene (PFA) further comprises filler particles such as silicone carbide, aluminum silicate, carbon black, zinc oxide, tin oxide etc.

The primer layer between the fluoropolymer resin layer and the tie layer is a mixture of a fluoropolymer resin and trifluoroethylene-perfluoroethylvinyl ether-perfluoroethylene vinyl phosphate, commercially available from DuPont under the trade name Teflon™ 855P322-33 or a mixture of perfluoroalkoxy resin and trifluoroethylene-perfluoroethylvinyl ether, commercially available from DuPont under the trade name Teflon™ 855P322-31. A primary object of this invention is to provide an adhesive layer between the tie layer (being made of fluoropolymers, fluoroelastomers, fluorocarbon thermoplastic copolymers and mixtures thereof) and perfluoalkoxy resin outer layer. A variety of other primer such as polyamide-imide, polyimide or epoxy resin have been used for this purpose, but it has been found that surprisingly superior results have achieved with these a mixture of a fluoropolymer resin and trifluoroethylene-perfluoroethylvinyl ether-perfluoroethylene vinyl phosphate or a mixture of perfluoroalkoxy resin and trifluoroethylene-perfluoroethylvinyl ether.

The primer is heated either preferably before it is applied the application of the fluoropolymer resin layer or before the sintering of the fluoropolymer resin layer.

The fluoropolymer resins in the primer layer composition can be any of the previously disclosed fluoropolymer resins, such as, polytetrafluoroethylene, polyperfluoroalkoxy-tetrafluoroethylene, polyfluorinated ethylene-propylene. It is not required that the fluoropolymer resin in the primer mixture be the same fluoropolymer resin or blend of fluoropolymer resins in the fluoropolymer resin layer. Preferred primers are perfluoroalkoxy resin and trifluoroethylene-perfluoroethylvinyl ether-perfluoroethylene vinyl phosphate or trifluoroethylene-perfluoroethylvinyl ether in a ratio of from 1 to 10 to 10 to 1 by weight of perfluoroalkoxy resin to trifluoroethylene-perfluoroethylvinyl ether or trifluoroethylene-perfluoroethylvinyl ether-perfluoroethylene vinyl phosphate.

The thickness of the layers of the fuser members of this invention can vary depending on the desired compliancy or non-compliancy of a fuser member. The preferred thicknesses of the layers for a fuser member having a base cushion layer as part of the support are as follows: the base cushion primer layer may be between 0.1 and 1 micron; the base cushion layer may be between 1 and 10 mm, the fluoroelastomer layer may be between 10 and 500 micron; and the fluoropolymer resin layer may be between 5 and 50 microns. The preferable thickness for the layers of a fuser member with base cushion layer (resilient layer) as part of the support are as follows: the adhesion promoter may be between 0.3 and 1 mils; the base cushion layer maybe between 2 and 6 mm; the fluoroelastomer layer may be between 10 and 50 micron; and the fluoropolymer resin layer may be between 5 and 30 microns.

The compositions of the above-described layers of the fuser member may optionally contain additives or fillers such as aluminum oxide, iron oxide, magnesium oxide, silicon dioxide, titanium dioxide, calcium hydroxide, lead oxide, zinc oxide, copper oxide and tin oxide to increase the thermal conductivity or the hardness of the layers. Pigments may be added to affect the color. Optional adhesive materials and dispersants may also be added.

The fuser members of this invention include a core member that includes a rigid outer surface. The coated fuser member of this invention having a support can be made by the following steps: An adhesion promoter layer comprising silane or epoxy silane coupling is disposed on cylindrical outer surface of the core member. A resilient layer including an elastomer is disposed on the adhesion promoter layer. A tie layer is disposed on the resilient layer, the tie layer being made of fluoropolymers, fluoroelastomers, fluorocarbon thermoplastic copolymers and mixtures thereof. The fluoroelastomer layer is applied to the adhesion promoter layer usually by compression-molding, extrusion-molding, or blade-, spray-, ring- or dip-coating the fluoroelastomer layer onto the support. The fluoroelastomer layer is then cured typically in an oven at temperatures between about 390° F. and 500° F. A primer layer is disposed on the tie layer, comprising perfluoroalkoxy resin and trifluoroethylene-perfluoroethyl vinyl ether-perfluoroethylene vinyl phosphate or a mixture of perfluoroalkoxy resin and trifluoroethylene-perfluoroethylvinyl ether. It is necessary to dry the primer layer before applying the fluoropolymer resin layer. The primer layer is then cured typically in an oven at temperatures between about 2000° F. and 300° F. and an outer layer of fluoropolymer resin made from polytetrafluoroethylene, polyperfluoroalkoxy-tetrafluoroethylene, polyfluorinated ethylene-propylene and blends thereof is disposed on the primer layer. The fluoropolymer resin layer is applied by ring-coating an aqueous emulsion of a fluoropolymer resin over the primer layer. Then, the fuser member is placed in an oven typically at temperatures between about 600° F. and 700° F. to cure the fluoropolymer resin layer. Next, anneal the surface of the outer layer by contact of the surface of the fuser member to the heating roller at a temperature from 500° F. to 800° F. to provide a fuser member having smooth surface finish. The fluoropolymer resin outer layer of the fuser member comprises a surface roughness of from 1 to 10 μm in $R_A$ and 20 to 40 $R_Z$ and a tensile modulus of from 30 to 60 Mpa at 175° C. In addition, the gloss of the roller surface finish comprises a G60 of from 30 to 50.

One embodiment of the invention has a condensation cured silicone rubber layer as part of the resilient layer. For example, to make a coated fuser member with a support including a metal element, silicone rubber primer layer, and a condensation cure silicone rubber layer, and then the fluoroelastomer layer, a primer layer and fluoropolymer resin layer, the method is as follows: Firstly, the metal element is cleaned and dried as described earlier. Secondly, the metal element is coated with a layer of a known silicone rubber primer, selected from those described earlier. A preferred primer for a condensation cure silicone rubber base cushion layer is GE 4044 supplied by General Electric. Thirdly, the silicone rubber layer is applied by an appropriate method, such as, blade-coating, ring-coating, injection-molding or compression-molding the silicone rubber layer onto the silicone rubber primer layer. A preferred condensation cure polydimethyl siloxane is EC-4952 produced by Emerson Cummings. Fourthly, the silicone rubber layer is cured, usually by heating it to temperatures typically between 410° F. and 450° F. in an oven. Fifthly, the silicone rubber layer undergoes corona discharge treatment usually at about 750 watts for 90 to 180 seconds. From here the process of applying and curing the fluoroelastomer layer, a primer layer, and fluoropolymer resin layer described above is followed.

In yet other embodiments of the invention with an addition cured silicone rubber layer as part of the resilient layer, the process is modified as follows. When the base cushion layer is an addition cure silicone rubber, the preferred silicone primer X-33-176 supplied by ShinEtsu Company is applied to the metal element. Then, the preferred addition cure silicone rubber X-34-1284 supplied by ShinEtsu Company is applied, for example, by injection-molding. The silicone rubber layer is then cured. If the base cushion layer is a fluorosilicone elastomer, the metal element is primed with a known silicone primer then the fluorosilicone elastomer layer is applied, usually by compression-molding and cured. If a fluoroelastomer-silicone interpenetrating network or other additional fluoroelastomer material is used as the base cushion layer or layers, an adhesion promoter appropriate for a fluoroelastomer layer is applied to the metal element, the fluoroelastomer base cushion layer is applied to the base cushion primer layer and cured. If the base cushion layer is a fluoroelastomer material it is not necessary to cure, prime or to corona discharge treat the base cushion fluoroelastomer layer before application of the fluoroelastomer layer to it.

There are optional sandblasting, grinding and polishing steps. As stated earlier, it is not necessary to sandblast the metal element because it is not required for good adhesion between the metal element and the adjacent layer. However, the fluoroelastomer layer and additional base cushion layer or layers, if any, may be ground during the process of making the fuser members. These layers may be mechanically ground to provide a smooth coating of uniform thickness that sometimes may not be the result when these layers are applied to the support, especially by the processes of compression-molding or blade-coating.

Any kind of known heating method can be used to cure or sinter the layers onto the fuser member, such as convection heating, forced air heating, infrared heating, and dielectric heating.

The fuser members produced in accordance with the present invention are useful in electrophotographic copying machines to fuse heat-softenable toner to a substrate. This can be accomplished by contacting a receiver, such as a sheet of paper, to which toner particles are electrostatically attracted in an imagewise fashion, with such a fuser member. Such contact is maintained at a temperature and pressure sufficient to fuse the toner to the receiver. Because these members are so durable they can be cleaned using a blade, pad, roller or brush during use. And, although it may not be necessary because of the excellent release properties of the fluoropolymer resin layer, release oils may be applied to the fuser member without any detriment to the fuser member.

The following examples illustrate the preparation of the fuser members of this invention.

EXAMPLE 1

A coated roller including, in order, a support, a base cushion adhesion promoter layer and a silicone rubber layer, and a fluoroelastomer tie layer, a primer layer, a PFA fluoropolymer resin layer was prepared.

A steel cylindrical core with a 3.5 inch outer diameter and 15.2 inch length that was blasted with glass beads and cleaned and dried with dichloromethane was uniformly spray-coated with an adhesion promoter ShinEtsu X-33-176 to a uniform thickness of from 0.1 to 0.2 mil. The adhesion promoter was air dried for 15 minutes and placed in a convection oven at 325° F. for 45 minutes. A silicone base cushion layer is then applied to the treated core. The preferred addition cure silicone rubber X-34-1284 supplied by ShinEtsu Company is applied, for example, by injection-molding. The silicone rubber then cured 24 hrs at room temperature, and post cured 3 hrs at 200° C. in a convection oven. The resulting thickness of the base cushion layer was 220 mil. The fluoroelastomer coating was prepared by compounding 100 parts of Fluorel™ 2640, 4 parts Cure™ 50, 3 parts magnesium oxide, 6 parts calcium hydroxide, 10 parts Thermax and 50 parts FEP are dissolved into a MEK solution to formed a 25 weight percent solid solution. A portion of the resulting solution was ring coated onto a core with the silicone base cushion layer as previously described and air dried for 1 hour. The conditions for the post-cure were a 24 hour ramp to 232° C. and held for 24 hours at 232° C. The resulting fluoroelastomer layer had 25 micron in thickness. The primer layer Teflon™ 855P322-33 available from DuPont Co., comprising perfluoroalkoxy resin and trifluoroethylene-perfluoroethylvinyl ether-perfluoroethylene vinyl phosphate, was ring coated onto a core with the silicone base cushion layer as previously described, then air dried for 1 hour. The conditions for the post-cure were a 1 hour ramp to 120° C. and 2 hours at 120° C. The resulting PFA primer Teflon™ 855P322-33 layer had 2 to 5 micron in thickness. An outer layer of Teflon™ 855P322-53, a PFA fluoropolymer resin was ring-coated onto the primer layer, and had about 0.5 mil in thickness. The fuser member was then placed in a convection oven at 700° F. for approximately 10 minutes to sinter the PFA Teflon™.

The roller had excellent adhesion between the layers. A peel strength test was performed. Typically, to perform a peel strength test of a multi-layer fuser member, the top layer is cut and clamped into an Instron apparatus and the force required to peel the PFA top layer from the adjacent layer on the roller is measured. For the roller made according to Example 1, the adhesion strength between the fluoropolymer resin layer and the fluoroelastomer layer is listed in Table 1.

EXAMPLE 2

A coated roller including, in order, a support, a base cushion adhesion promoter layer and a silicone rubber layer, and a fluoroelastomer layer, a primer layer, a PFA fluoropolymer resin layer was prepared.

Example 1 was repeated, instead the top layer is cut and clamped into an Instron apparatus and the force required to peel the PFA top layer from the adjacent layer on the roller is measured, the life tests of the roller was performed by putting the roller in the NexPress 2100 machine.

EXAMPLE 3

A coated roller including, in order, a support, a base cushion adhesion promoter layer and a silicone rubber layer, and a fluoroelastomer layer, a primer layer, a PFA fluoropolymer resin layer was prepared.

Example 1 was repeated, instead the top layer is cut and clamped into an Instron apparatus and the force required to peel the PFA top layer from the adjacent layer on the roller is measured, the life tests of the roller was performed by putting the roller in the NexPress 2100 machine.

TABLE 1

Adhesion test

| Experimental Example | PFA topcoat | Primer | Viton Tie Layer | Base Cushion | Adhesion (gmw) |
|---|---|---|---|---|---|
| E-1 | 855P322-53 | 33 | Fluoroelastomer | X-34-1284 | 263 |
| C-1 | 855P322-32 | 31 | None | X-34-1284 | 72 |
| C-2 | 855P322-32 | None | None | X-34-1284 | <32 |

The minimum detectable load of adhesion was 32.

COMPARATIVE EXAMPLE 1

A coated roller including in order, a support, a base cushion adhesion promoter layer and a silicone rubber layer, and a PFA primer layer, a PFA fluoropolymer resin layer was prepared.

Example 1 was repeated, instead the Teflon™ 855P322-33 primer layer and the Teflon™ 855P322-53 as the outer layer, Teflon™ 855P322-31 primer including a mixture of perfluoroalkoxy resin was disposed on the base cushion layer and trifluoroethylene-perfluoroethylvinyl ether and Teflon™ 855P322-32 outer layer was applied as an outer layer. In addition, there is no fluoroelastomer between the base cushion layer and the primer layer.

COMPARATIVE EXAMPLE 2

A coated roller consisting of, in order, a support, a base cushion primer layer and a silicone rubber layer, and a PFA fluoropolymer resin outer layer was prepared.

Comparative example 1 was repeated, except no primer layer was applied between the base cushion layer and the fluoropolymer resin outer layer.

COMPARATIVE EXAMPLE 3

A coated roller including, in order, a support, a base cushion adhesion promoter layer and a silicone rubber layer, a primer layer, a PFA fluoropolymer resin layer was prepared.

Example 1 was repeated, except there is no fluoroelastomer tie layer between the base cushion layer and the primer layer. Instead, the top layer is cut and clamped into an Instron apparatus and the force required to peel the PFA top layer from the adjacent layer on the roller is measured, the life tests of the roller was performed by putting the roller in the NexPress 2100 machine.

The same peal test of the adhesion was performed on the rollers prepared in Comparative Example 1 and Comparative Example 2. Results of the tests the adhesion strength between the fluoropolymer resin layer and the silicone rubber layer are listed in Table 1.

Roller Life Test

The life tests of the rollers prepared in Example 2, Example 3 and Comparative Example 3 were performed by putting the roller in the Nexpress 2100 machine. The results of the tests are listed in Table 2.

Roller life test is to subject the fuser member to a surface temperature ranging from 175° C. to 180° C. during printing. The surface temperature of the fuser member is maintained by either the internal heating and the contacting external heater rollers, preferably both. The temperature of the external heater rollers ranges from 230° C. to 250° C. and the contacting nip width between the external heater rollers and the fuser member ranges from 10% to 20% of the heat roller diameter. The substrate (paper) used is of thickness 330 micron and of a planar density of 300 grams per square meter. The nip width between the fuser member and the counteracting pressure roller to fuse the toner was set at 20% of the diameter of the fuser member with a range of +/−1%. The substrate (paper) size can be Tabloid, i.e., 11"×17", or similar. The toner amount on the substrate was set near 0 to simulate a stressed printing condition for the topcoat. The printing speed ranges from 90 to 110 ppm. The fuser member assembly is inspected directly and with print or so to detect the emergence of surface anomaly. Inspection includes inside paper path and outside paper path of the fuser member surface. Record of the fuser member condition is kept every 1000 to 2000 A4 equivalent sheets.

TABLE 2

Roller life test

| Experimental Example | PFA topcoat | Primer | Viton Tie Layer | Base Cushion | Life (A4 eqv. pages) |
|---|---|---|---|---|---|
| E-2 | 855P322-53 | 33 | Fluoroelastomer | X-34-1284 | >37,000 |
| E-3 | 855P322-53 | 33 | Fluoroelastomer | X-34-1284 | >100,000 |
| C-3 | 855P322-53 | 33 | None | X-34-1284 | >20,000# |

#Outside paper path showed cracks.

The roller of the current invention from Examples 1, 2 and 3 had superior performance than the rollers prepared from Comparative example 1, Comparative example 2 and Comparative example 3. The result of the adhesion test and the roller life test of the inventive roller consistently demonstrated that the rollers had excellent adhesion strength and durability than the prepared rollers without the fluoroelastomer tie layer. Further, from the roller life test, the fluoroelastomer tie layer of the inventive roller prevent the degradation of the silicone base cushion layer, e.g., cracking under high temperature condition due to the heat from the external heating rollers, particularly the area outside the paper path, and the sintering of the fluoropolymer resin PFA topcoat.

The invention has been described in detail with particular reference to certain preferred embodiments thereof, but it will be understood that variations and modifications can be effected within the spirit and scope of the invention.

It is claimed:

1. A fuser roller comprising:

a core member comprising a rigid outer surface;

an adhesion promoter layer disposed on the outer surface comprising silane or epoxy silane coupling agent;

a resilient layer disposed on said adhesion promoter layer;

a tie layer formed on said resilient layer, said tie layer selected from the group consisting of fluoropolymers, fluoroelastomers, fluorocarbon thermoplastic copolymers and mixtures thereof a primer layer, disposed on said tie layer, comprising perfluoroalkoxy resin and trifluoroethylene-perfluoroethyl vinyl ether-perfluoroethylene vinyl phosphate or a mixture of perfluoroalkoxy resin and trifluoroethylene-perfluoroethylvinyl ether; and an outer layer disposed on said primer layer, said outer layer comprising a fluoropolymer resin.

2. The fuser member of claim 1, wherein said outer layer further comprises filler particles.

3. The fuser member of claim 1, wherein said outer layer comprises a thickness of from 5 to 50 microns.

4. The fuser roller of claim 1, wherein the resilient layer comprises a silicone rubber.

5. The fuser member of claim 1, wherein said fluoropolymer resin is selected from the group consisting of polytetrafluoroethylene, polyperfluoroalkoxy-tetrafluoroethylene, polyfluorinated ethylene-propylene, and blends thereof.

6. The fuser member of claim 1, wherein said outer layer comprises a tensile modulus of from 30 to 60 Mpa at 175° C.

7. The finer member of claim 1, wherein said outer layer comprises a surface roughness of from 1 to 10 micro inch $R_A$.

8. The fuser member of claim 1, wherein said outer layer comprises a surface roughness of from 20 to 40 $R_z$.

9. The fuser member of claim 1, wherein said outer layer comprises a G60 of from 30 to 50.

10. The fuser member of claim 1, wherein said tie layer comprises a fluoroelastomer polymer.

11. The fuser member of claim 10, wherein said fluoroelastomer polymer is a copolymer of vinylidene fluoride and hexafluoropropylene.

12. The fuser member of claim 10 wherein said fluoroelastomer polymer is a terpolymer of vinylidene fluoride, hexafluoropropylene, and tetrafluoroethylene.

13. The fuser member of claim 1, wherein said tie layer comprises a fluorocarbon thermoplastic copolymer comprising a copolymer of vinylidene fluoride and hexafluoropropylene, the cured fluorocarbon thennoplastics random copolymer having subunits of:

$-(CH_2\ CF_2)x-$, $-(CF_2\ CF(CF_3))y-$, and $-(CF_2\ CF_2)z-$, wherein x is from 1 to 40 or 60 to 80 mole percent, z is greater than 40 to no more than 89 mole percent, and y is such that x+y+z equals 100 mole percent.

14. The fuser member of claim 1 wherein said tie layer comprises a fluoroelastomer layer disposed on the resilient layer comprising a compounded mixture of a fluoroelastomer polymer, 2,2'-bis(4-hydroxyphenyl) hexatluoropropane, benzyl triphenylphosphonium chloride, and acid acceptor filler; wherein said fluoroelastomer polymer is a copolymer of vinylidene fluoride and hexafluoropropylene, or a terpolymer of vinylidene fluoride, hexafluoropropylene, and tetrafluoroethylene.

15. The fuser member of claim 14 wherein said tie layer further comprises perfluoroalkoxy vinyl ether.

16. The fuser member of claim 14 wherein said tie layer further comprises polyfluorinated ethylene-propylene.

17. The fuser member of claim 14, wherein said acid acceptor filler comprises magnesium oxide, calcium hydroxide, or mixtures thereof.

18. The fuser member of claim 15, wherein said perfluoroakoxy vinyl ether comprises from ten to 100 pph based on the weight of the fluoroelastomer layer.

* * * * *

UNITED STATES PATENT AND TRADEMARK OFFICE

CERTIFICATE OF CORRECTION

PATENT NO. : 7,534,492 B2
APPLICATION NO. : 11/472888
DATED : May 19, 2009
INVENTOR(S) : Jiann-Hsing Chen et al.

It is certified that error appears in the above-identified patent and that said Letters Patent is hereby corrected as shown below:

Column 16, claim 7, after “The,” delete “finer” and insert -- fuser --.

Column 17, claim 13, delete “thennoplastics” and insert -- thermoplastics --.

Column 17, claim 13, delete the chemical structure and insert
-- $—(CH_2\ CF_2)x—$, $—(CF_2\ CF(CF_3))y—$, and $—(CF_2\ CF_2)z—$, --.

Column 18, claim 14, delete “hexatluoropropane” and insert -- hexafluoropropane --.

Column 18, claim 18, delete “perfluorokoxy” and insert -- perfluoroalkoxy --.

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,534,492 B2
APPLICATION NO. : 11/472888
DATED : May 19, 2009
INVENTOR(S) : Jiann-Hsing Chen et al.

It is certified that error appears in the above-identified patent and that said Letters Patent is hereby corrected as shown below:

Column 16, claim 7, line 64, after “The,” delete “finer” and insert -- fuser --.

Column 17, claim 13, line 14, delete “thennoplastics” and insert -- thermoplastics --.

Column 17, claim 13, lines 16-17, delete the chemical structure and insert -- —$(CH_2\ CF_2)x$—, —$(CF_2\ CF(CF_3))y$—, and —$(CF_2\ CF_2)z$—, --.

Column 18, claim 14, line 4, delete “hexatluoropropane” and insert -- hexafluoropropane --.

Column 18, claim 18, lines 17-18, delete “perfluorokoxy” and insert -- perfluoroalkoxy --.

This certificate supersedes the Certificate of Correction issued July 7, 2009.

Signed and Sealed this

Fourth Day of August, 2009

JOHN DOLL
*Acting Director of the United States Patent and Trademark Office*